United States Patent
Vassilieva et al.

(10) Patent No.: US 9,042,730 B2
(45) Date of Patent: May 26, 2015

(54) SYSTEM AND METHOD FOR COMPENSATING SIGNAL DEGRADATION IN DUAL POLARIZATION OPTICAL SYSTEMS

(71) Applicant: Fujitsu Limited, Kanagawa (JP)

(72) Inventors: Olga Vassilieva, Plano, TX (US);
Inwoong Kim, Allen, TX (US);
Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 126 days.

(21) Appl. No.: 13/763,104

(22) Filed: Feb. 8, 2013

(65) Prior Publication Data
US 2014/0226971 A1   Aug. 14, 2014

(51) Int. Cl.
*H04B 10/00* (2013.01)
*H04B 10/61* (2013.01)

(52) U.S. Cl.
CPC ........ *H04B 10/6162* (2013.01); *H04B 10/6163* (2013.01)

(58) Field of Classification Search
CPC ........... H04B 10/6162; H01B 10/2572; H01B 10/2569
USPC ........................................... 398/152, 81, 158
See application file for complete search history.

(56) References Cited

U.S. PATENT DOCUMENTS

| | | | | |
|---|---|---|---|---|
| 7,835,643 | B2* | 11/2010 | Futami et al. | 398/25 |
| 8,457,504 | B2* | 6/2013 | Hueda et al. | 398/208 |
| 8,705,167 | B2* | 4/2014 | Akasaka | 359/341.4 |
| 2003/0039426 | A1* | 2/2003 | Lanne et al. | 385/11 |
| 2005/0002099 | A1* | 1/2005 | He et al. | 359/494 |
| 2010/0098420 | A1* | 4/2010 | Ibragimov et al. | 398/65 |
| 2010/0111530 | A1* | 5/2010 | Shen et al. | 398/65 |
| 2012/0002977 | A1* | 1/2012 | Hueda et al. | 398/149 |
| 2012/0050846 | A1* | 3/2012 | Akasaka | 359/344 |
| 2012/0063783 | A1 | 3/2012 | Vassilieva et al. | 398/81 |
| 2012/0106615 | A1* | 5/2012 | Carrer et al. | 375/231 |
| 2014/0023362 | A1* | 1/2014 | Vassilieva et al. | 398/26 |
| 2014/0226971 | A1* | 8/2014 | Vassilieva et al. | 398/25 |

OTHER PUBLICATIONS

Kazuro Kikuchi; "Electronic Post-compensation for Nonlinear Phase Fluctuations in a 1000-km 20-Gbit/s Optical Quadrature Phase-shift Keying Transmission System Using the Digital Coherent Receiver"; Optics Express; vol. 16, No. 2; pp. 889-896, Jan. 21, 2008.

* cited by examiner

*Primary Examiner* — Danny Leung
(74) *Attorney, Agent, or Firm* — Baker Botts L.L.P.

(57) ABSTRACT

A method for adjusting an optical signal includes determining a polarization dependent loss (PDL) value associated with the optical signal, determining an angle between the optical signal and one or more axes of PDL, determining an amount of nonlinear phase noise due to PDL and nonlinear effects upon the optical signal based upon the PDL value and the angle, determining a phase rotation based upon the amount of nonlinear phase noise, and applying the phase rotation to the optical signal.

20 Claims, 6 Drawing Sheets

SYSTEM AND METHOD FOR COMPENSATING SIGNAL DEGRADATION IN DUAL POLARIZATION OPTICAL SYSTEMS

TECHNICAL FIELD

The present disclosure relates generally to optical communication networks and, more particularly, to a system and method for compensating signal degradation in dual polarization optical systems.

BACKGROUND

Telecommunications systems, cable television systems and data communication networks use optical networks to rapidly convey large amounts of information between remote points. In an optical network, information is conveyed in the form of optical signals through optical fibers. Optical networks may also include various network elements such as amplifiers, dispersion compensators, multiplexer/demultiplexer filters, wavelength selective switches, couplers, etc. configured to perform various operations within the network.

However, each of these network elements may also introduce polarization dependent effects on the signals traveling through the network. These effects may cause the various components of the polarization states of the signals to experience varying degrees of loss or gain, thus causing unequal power levels of the various polarization components of the signals. This inequality of power may cause information or data carried by the signals to become distorted or lost.

SUMMARY

In accordance with one embodiment, a method for adjusting an optical signal includes determining a polarization dependent loss (PDL) value associated with the optical signal, determining an angle between the optical signal and one or more axes of PDL, determining an amount of nonlinear phase noise due to PDL and nonlinear effects upon the optical signal based upon the PDL value and the angle, determining a phase rotation based upon the amount of nonlinear phase noise, and applying the phase rotation to the optical signal.

In accordance with another embodiment, a system for adjusting an optical signal includes an optical network configured to transmit the optical signal and a compensator. The compensator is configured to determine a PDL value associated with the optical signal, determine an angle between the optical signal and one or more axes of PDL, determine an amount of nonlinear phase noise due to PDL and nonlinear effects upon the optical signal experienced during transmission by the optical network, determine a phase rotation based upon the amount of nonlinear phase noise, and apply the phase rotation to the optical signal. The amount is based upon the PDL value and the angle.

In accordance with yet another embodiment, a compensator includes a processor coupled to a memory, and instructions resident on the memory. The instructions are readable by the processor. The instructions, when read, are configured to cause the processor to determine a PDL value associated with an optical signal transmitted through an optical network, determine an angle between the optical signal and one or more axes of PDL, determine an amount of nonlinear phase noise due to PDL and nonlinear effects upon the optical signal experienced during transmission by the optical network, determine a phase rotation based upon the amount of nonlinear phase noise, and apply the phase rotation to the optical signal. The amount is based upon the PDL value and the angle.

The object and advantages of the invention will be realized and attained at least by the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
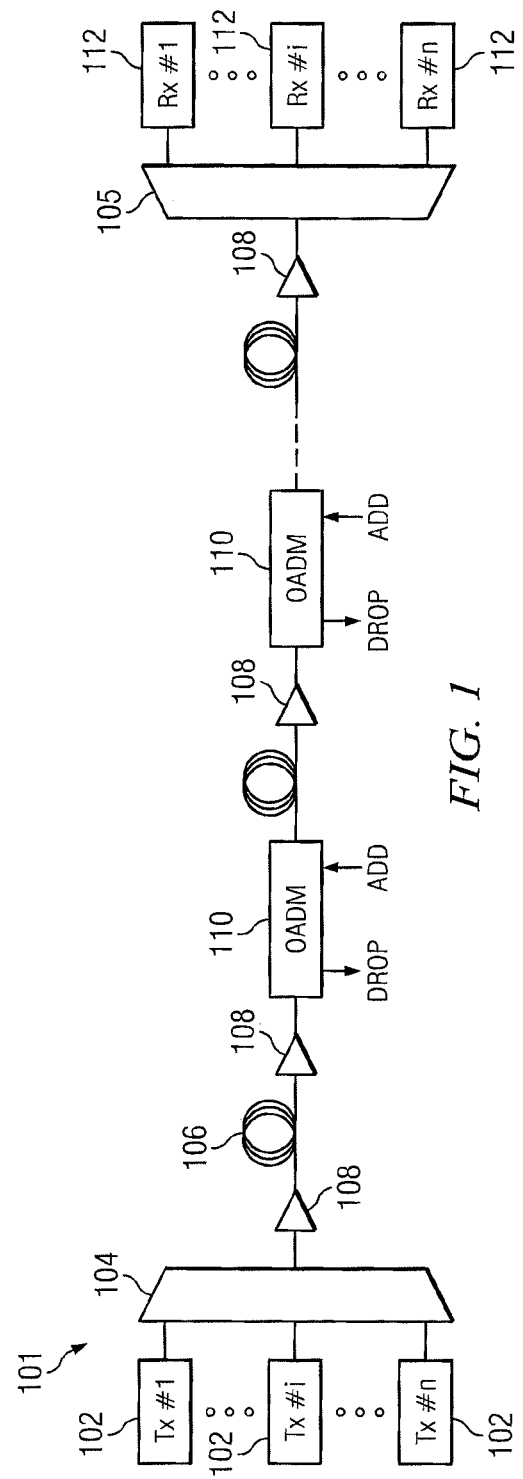
FIG. 1 illustrates an example embodiment of an optical network.

FIG. 1 illustrates an example embodiment of an optical network 101. Optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber, such as a Single-Mode Fiber (SMF), Enhanced Large Effective Area Fiber (ELEAF), or a TrueWave® Reduced Slope (TW-RS) fiber.

Optical network 101 may include devices configured to transmit optical signals over fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 101 may be configured to transmit disparate channels using WDM, DWDM, or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within network 101. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, Amplifiers 108 may comprise an erbium-doped fiber amplifier (EDFA). However, any other suitable amplifier, such as a semiconductor optical amplifier (SOA), may be used.

OADMs 110 may be coupled to network 101 via fibers 106 also. OADMs 110 comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination.

Network 101 may also include one or more demultiplexers 105 at one or more destinations of network 101. Demultiplexer 105 may comprise any system apparatus or device that may act as a demultiplexer by splitting a single WDM signal into its individual channels. For example, network 101 may transmit and carry a forty channel DWDM signal. Demultiplexer 105 may divide the single, forty channel DWDM signal into forty separate signals according to the forty different channels.

Network 101 may also include receivers 112 coupled to demultiplexer 105. Each receiver 112 may be configured to receive signals transmitted in a particular wavelength or channel, and process the signals for the information that they contain. Accordingly, network 101 may include at least one receiver 112 for every channel of the network.

Modifications, additions or omissions may be made to network 101 without departing from the scope of the disclosure. For example, network 101 may include more or fewer elements than those depicted. Additionally network 101 may include additional elements not expressly shown, such as a dispersion compensation module. Also, as mentioned above, although depicted as a point to point network, network 101 may comprise any suitable network for transmitting optical signals such as a ring or mesh network.

Figure 2A:
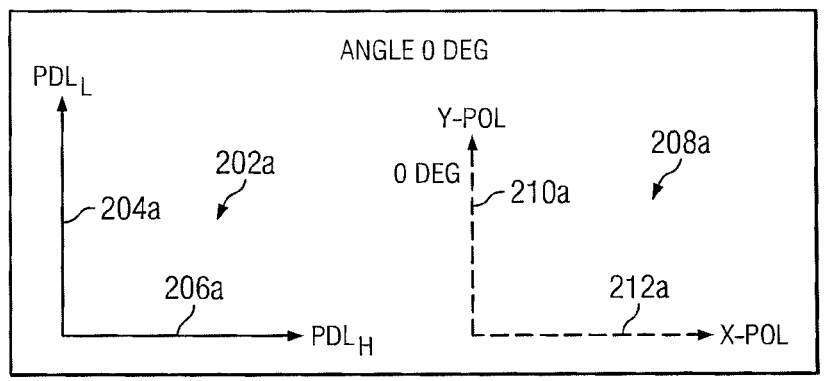
FIG. 2a illustrates the effects of polarization dependent loss (PDL) on signals with modulated polarization components substantially aligned with the high and low loss axes of PDL.
Figure 2A:
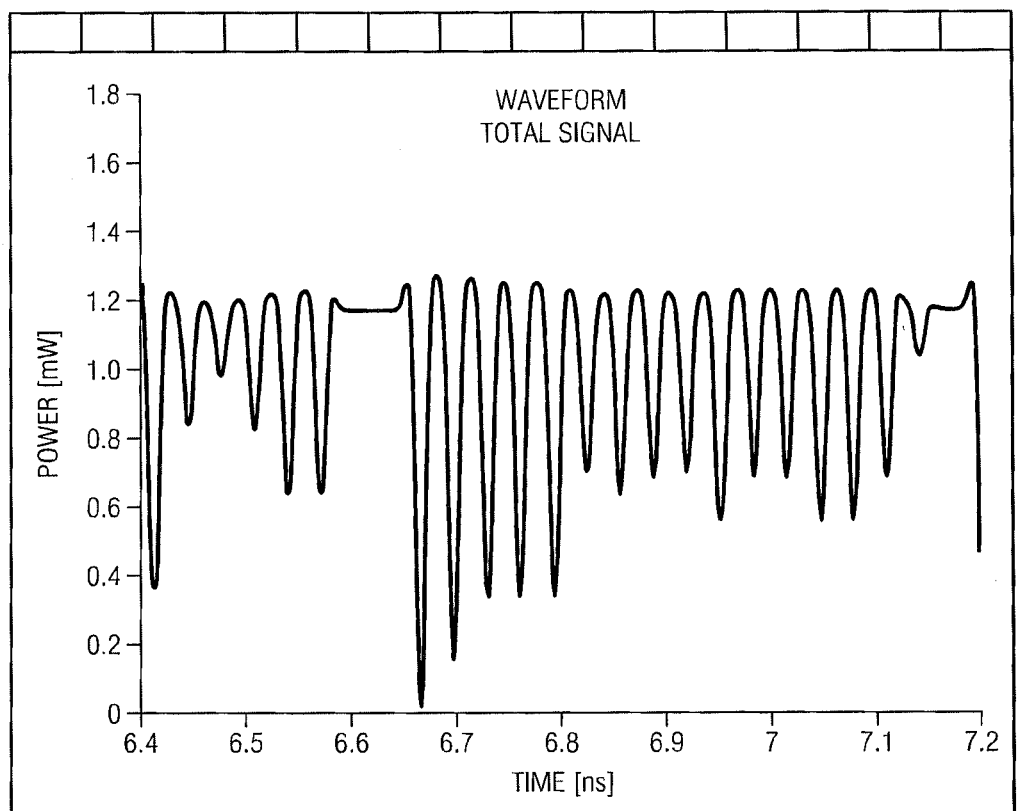
Figure 2B:
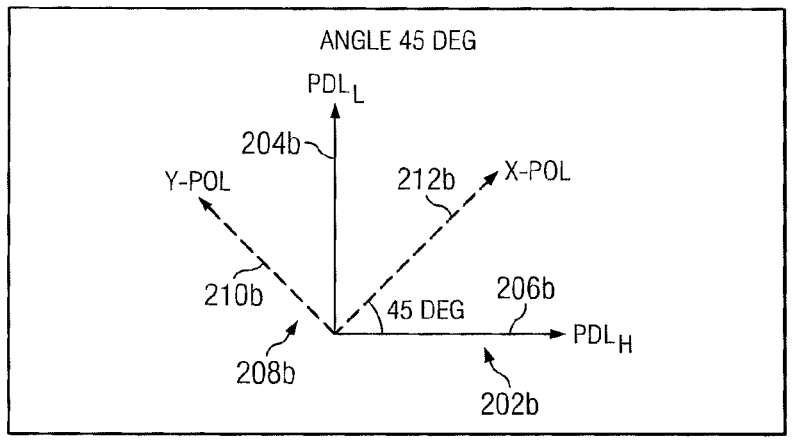
FIG. 2b illustrates the effects of PDL on signals with modulated polarization components oriented approximately forty-five degrees with respect to the high and low axes of the PDL.
Figure 2B:
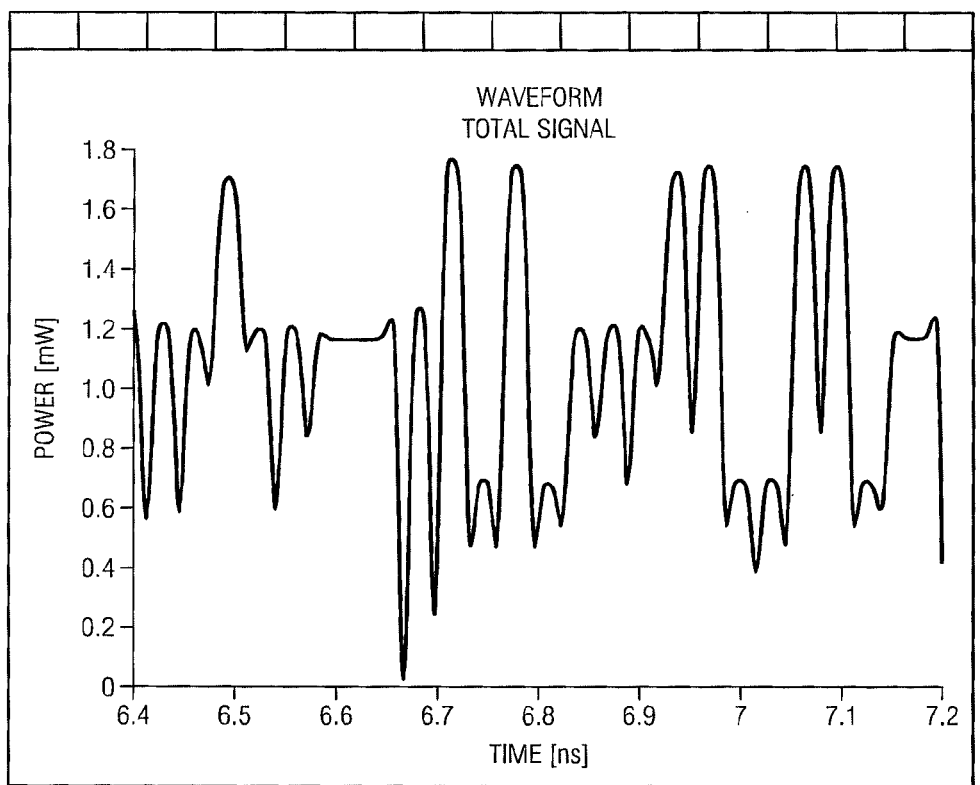

FIGS. 2a and 2b illustrate the effects of polarization dependent loss on signals traveling through an optical network, such as network 101.

As discussed above, the amount of information that may be transmitted over an optical network may vary with the number of optical channels coded with information and multiplexed into one signal. Accordingly, an optical signal employing WDM may carry more information than an optical signal carrying information over solely one channel. An optical signal employing DWDM may carry even more information. Besides the number of channels carried, another factor that affects how much information can be transmitted over an optical network may be the bit rate of transmission. The greater the bit rate, the more information may be transmitted.

Polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal. The term "linear polarization" may generally refer to a single direction of the orientation of the electric field vector. Generally, an arbitrary linearly polarized wave can be resolved into two independent orthogonal components labeled x and y, which are in phase or out of phase with each other. For example, in polarization multiplexed transmission, an optical beam created by a laser may be highly linearly polarized. The beam may be divided by a polarization beam splitter according to the x-polarization component of the beam and the y-polarization component of the beam. Upon being split, the x-polarization component may be aligned with a horizontal axis and the y-polarization component may be aligned with a vertical axis of the beam. It is understood that the terms "horizontal" polarization and "vertical" polarization are merely used to denote a frame of reference for descriptive purposes, and do not relate to any particular polarization orientation.

Following splitting of the beam into the x and y polarization components, information may be modulated onto both beams. Following modulation, both beams may be combined by a polarization beam combiner such that the combined beam comprises an optical signal with two polarization components (e.g., an x-polarization component and a y-polarization component) with information modulated onto each polarization component. Accordingly, by modulating information onto both the y-polarization component and x-polarization component of the signal, the amount of information that may be carried by the channel associated with the signal over any given time may increase (e.g., increasing the bit rate of the channel).

In the present disclosure, it is understood that as signals travel through the network, the polarization of the signals may rotate with respect to the frame of reference. Consequently, the modulated x and y polarizations may also be rotated such that the components are no longer aligned with the horizontal axis and the vertical axis of the frame of reference. However, the terms "x-polarization" and "y-polarization" of the signal may still be used to denote the polarization components with information modulated thereon even if the modulated x and y polarization components are no longer oriented with the horizontal and vertical axes of the frame of reference.

The various elements and devices in optical networks may affect the modulated x and y polarization components of each channel associated with the optical signals in different manners. Fibers 106, multiplexers 104, and add/drop modules 110 may attenuate signals as the signals pass through these elements and amplifiers 108 may amplify the signals. These elements may attenuate and amplify the various polarization components of each channel within the signals differently, thus causing a polarization dependent loss (PDL) and a polarization dependent gain (PDG).

For example, a multiplexer 104 may attenuate the modulated y-polarization of a wavelength associated with a channel greater than it may attenuate the modulated x-polarization of the same wavelength. Additionally, the modulated x and y polarizations of one wavelength associated with one channel may be affected differently than the x and y polarization of another wavelength associated with a different channel. Similarly, amplifiers 108 may amplify the modulated x and y polarization components of each channel associated with the optical signals differently. Accordingly, in a multi-polarization WDM signal, each modulated polarization component of each channel may experience varying degrees of gain and loss while passing through an optical network. Although the polarization dependent effects of the various network components may result from both PDL and PDG, the overall result of the effects may be referred to simply as PDL.

As mentioned above, these polarization dependent effects (e.g., PDL) may cause the different modulated polarization components of the polarization multiplexed signals to be amplified and attenuated at varying degrees, which may cause signal distortion and loss of information. The difference between the power of the modulated polarization component experiencing the most loss and the modulated polarization component experiencing the least loss may be a representation of the PDL of the signal as it passes through a network. The difference between the two indicates how the power of one polarization component has been affected by the various elements of the network compared to the power of the other polarization component, and thus may represent the PDL experienced by the signal. This difference may be represented in decibels (dB).

For example, in a dual-polarization signal, the modulated y-polarization may experience more loss than the modulated x-polarization, due to PDL, such that the signal power of the y-polarization is lower than the signal power of the x-polarization. The difference between the x-polarization and the y-polarization may represent the PDL experienced by the signal.

The PDL experienced by a signal depends on the PDL of the network or network element that the signal passes through. The PDL of the network or network elements may include a high loss axis and a low loss axis. The PDL of a network element may be associated with the maximum and minimum attenuation experienced by all the polarization components of an optical signal as the signal passes through a network element or device. The high loss axis of the PDL may be referred to as the orientation of the polarization that experiences maximum loss and the low loss axis may refer to the orientation of the polarization that experiences minimum loss.

For example, a network element may attenuate polarization components of optical signals aligned with the horizontal axis of a frame of reference of the optical signals the most and may attenuate polarization components of the optical signals aligned with the vertical axis of the frame of reference the least. Consequently, the high loss axis of the PDL of the network element may correspond with the horizontal axis of a frame of reference, and the low loss axis may correspond with the vertical axis of the frame of reference.

Polarization dependent effects experienced by each signal traveling through a network may also vary. Due to switching within networks, different signals may pass through different network elements that may create different polarization dependent effects. Additionally, environmental and physical factors such as bending and moving of fibers may also change the PDL of network elements such that the PDL experienced by signals traveling through a network may also change.

Signal degradation due to PDL may depend on the orientation between the high and low loss axes of the PDL and the signal polarization components modulated with information. FIG. 2a illustrates the effects of PDL on signals with modulated x and y polarization components substantially aligned with the high and low loss axes of PDL.

For example, in FIG. 2a, PDL 202a and a signal 208a are depicted. PDL 202a may represent the polarization dependent loss created by one or more network elements. PDL 202a may include a low loss axis 204a and a high loss axis 206a. Low loss axis 204a may be oriented such that the polarization component of signals oriented with the vertical axis of a frame of reference and passing through the network element associated with PDL 202a are attenuated or amplified the least. Consequently, low loss axis 204a may correspond with the vertical axis of the frame of reference. Additionally, high loss axis 206a may be oriented such that the polarization components of signals oriented with the horizontal axis and passing through the network element associated with PDL 202a are attenuated the most. Accordingly, high loss axis 206a may correspond with the horizontal axis of the frame of reference.

Signal 208a may include a y-polarization component 210a and an x-polarization component 212a. Polarization components 210a and 212a may each be modulated with information or traffic. Y-polarization component 210a may be oriented such that it is substantially aligned with low loss axis 204 and the vertical axis of the frame of reference. Additionally, x-polarization component 212a may be oriented such that it is substantially aligned with high loss axis 206a and the horizontal axis of the frame of reference.

Graph 214a depicts the average power of a signal, such as signal 208a, over time when y and x polarization components 210a and 212a are aligned with low and high loss axes 204a and 206a. As shown in graph 214a, when y and x polarization components 210a and 212a are approximately aligned with low and high loss axes 204a and 206a, the maximum power of signal 208a may be at a substantially constant level. Thus, the receivers receiving the signals may accurately process the information or data modulated onto the signals.

FIG. 2b illustrates the effects of PDL on signals with modulated polarization components oriented approximately forty-five degrees with respect to the high and low axes of the PDL. In FIG. 2b, PDL 202b may be substantially similar to PDL 202a depicted in FIG. 2a. Accordingly, PDL 202b may include low and high loss axes 204b and 206b that respectively correspond with the vertical and horizontal axes of the frame of reference.

Signal 208b may include modulated y-polarization component 210b and modulated x-polarization component 212b. Modulated y and x polarization components 210b and 212b may be oriented forty-five degrees between the horizontal and vertical axes. Accordingly, modulated polarization components 210b and 212b of signal 208b are oriented at forty-five degrees with respect to low and high loss axes 204b and 206b of PDL 202b—due to low and high loss axes 204b and 206b respectively corresponding with the vertical and horizontal axes of the frame of reference.

Graph 214b depicts the average power of a signal, such as signal 208b, over time when modulated polarization components 210b and 212b are oriented at forty-five degrees with respect to the high and low loss axes 206b and 204b of PDL 202b. When polarization components 210b and 212b are oriented at forty-five degrees with respect to high and low axes 206b and 204b, the PDL introduces large data dependent peak-to-peak optical power variations which may result in higher nonlinear phase noise generation. These nonlinear effects may greatly increase the optical signal to noise ratio (OSNR) penalty of signal 208b which may result in an inability to read the information modulated thereon. These large power variations due to the PDL effects may be seen in graph 214b with the many different spikes in maximum power of the signal.

Changes may be made to FIGS. 2a and 2b without departing from the scope of the present disclosure. For example, the orientations depicted are merely for illustrative purposes to depict the relative relationship between the orientations of high and low loss axes of PDL of a network element with respect to the polarization components of an optical signal.

Additionally, although the orientation of the modulated x and y polarization components of signals with respect to the high and low loss axes of the PDL has been described, simple reference to the orientation of signals with respect to PDL without mentioning the polarization components of the signals or the high and low loss axes of the PDL in the present disclosure may connote the same idea. Also, rotation of the polarization of a signal may be referred to simply as the rotation of the signal.

In addition to PDL effects as shown above, signals may also experience nonlinear effects (NL). Signals with modulated polarization components oriented approximately forty-five degrees may experience particularly heightened NL due to large, data-dependent optical power variations which result in nonlinear phase noise.

In one embodiment, the quantification of the effects of the combination of PDL and NL may include estimations of optical power considering PDL. The optical power variation may include factors such as the PDL amount and the angle between the signal and PDL axes. For example, Ex and Ey may include electric fields associated with x- and y-polarization components, respectively; a given element of network 101 may include linear PDL loss η; PDL losses measured in decibels as 10*log 10((1+η)/(1−η)); θ may include an angle between the signal and PDL axes; and Px and Py may include optical power of x- and y-polarization field components. Optical power or intensity may be expressed in terms of the electric fields as:

$$P_x=|E_x|^2 \text{ and } P_y=|E_y|^2$$

An optical field A(z,t) of the signal after passing a portion of the network may thus be expressed by:

$$A(z,t) = \begin{vmatrix} \cos\theta & -\sin\theta \\ \sin\theta & \cos\theta \end{vmatrix} \cdot \begin{vmatrix} \sqrt{1+\eta} & 0 \\ 0 & \sqrt{1-\eta} \end{vmatrix} \cdot \begin{vmatrix} \cos\theta & \sin\theta \\ -\sin\theta & \cos\theta \end{vmatrix} \cdot \begin{vmatrix} Ex \\ Ey \end{vmatrix}$$

and thus the optical field intensity $|A|^2$ of the signal is equal to:

$$|A|^2=|Ex|^2+|Ey|^2+\eta\cdot\cos 2\theta\cdot(|Ex|^2-|Ey|^2)+2\cdot\eta\cdot\sin 2\theta\cdot|Ex|\cdot|Ey|$$

Of this measure of the optical field strength, the portion defining the variation of the power of the optical field as induced by PDL may include:

$$\Delta P_{PDL}=2\cdot\eta\cdot\sin 2\theta\sqrt{Px\cdot Py}$$

In another embodiment, the quantification of the effects of the combination of PDL and NL may include estimations of phase shift. The phase shift due to PDL and NL may be based upon, for example, such factors as the PDL amount and the angle between the signal and PDL axes. For example, PDL loss η may be determined; $L_{eff}$ may include the fiber effective length within a given span; the number of span of distance may be expressed by Nspan; γ may include the fiber nonlinear coefficient; θ may include an angle between the signal and PDL axes; and P may include the peak power of the optical field. Thus, the non-linear phase shift induced by PDL may be expressed by $$\Delta\phi_{NL}=\gamma\cdot\Delta P_{PDL}\cdot L_{eff}=\gamma\cdot L_{eff}\cdot 2\cdot\eta\cdot\text{Nspan}\cdot\sin 2\theta\cdot P$$

Thus, both the non-linear phase shift and power variations introduced by NL and PDL may be dependent upon the angle between the transmitted optical signal and the PDL polarization axes. However, the angle between the transmitted optical signal and the PDL polarization axes may rotate randomly during fiber transmission. In some embodiments, an average PDL value $\eta_{avg}$ and effective angle $\theta_{eff}$ may be determined. Such an average PDL value and effective angle may be determined in any suitable manner. These may be determined for an implementation of a given network 101 through, for example, experimentation or simulation. In one embodiment, $\theta_{eff}$ may be determined by matching simulation results of a fixed angle model with a random angle model. In another embodiment, $\theta_{eff}$ may be determined based upon one or more of system parameters such as baud rate, channel spacing, fiber type, the dispersion of a given fiber type, or a dispersion map. For example, $\theta_{eff}$ may be determined by previous calculations of the effective angle of the type of fiber used in network 101. Such results may include an $\theta_{eff}$ of approximately thirty degrees for E-LEAF fiber or twenty degrees for SMF fiber. In yet another embodiment, an average PDL loss value $\eta_{avg}$ may be determined for one or more components of network 101 experimentally, through simulation, or instantaneous measurement.

A receiver of network 101 may be configured to measure the optical field A(L, T), where L denotes the transmission distance, which may be distorted by dispersion and fiber NL. Distortion of these kinds may be larger in dispersion-compensated links. In one embodiment, a receiver of network 101 may compensate for dispersion, and the resultant optical field may be given as $$A(L,T)=A_o\cdot\exp(j\phi_d+\Delta\phi_{NL}+\Theta)$$

wherein L includes the transmission distance; $\phi_d$ includes the phase of the data signal; Ao may include the amplitude of received optical field; $\Delta\phi_{NL}$ includes the phase noise or phase shift due to NL and PDL effects; and Θ may include the carrier phase noise.

The determined or approximated signal degradation due to the combination of NL and PDL may be mitigated by applying a phase rotation that is inversely proportional to the phase shift that was induced (for example, $\Delta\phi_{NL}$). For application to the optical field of a received signal, such a phase rotation may be applied by multiplying the optical field times $\exp(-j\Delta\phi_{NL})$. Thus, a corrected optical field $A_c$ may be given by:

$$A_c = A(L,T) \cdot \exp(-j\Delta\phi_{NL}) = A_o \cdot \exp(j\phi_d + \Delta\phi_{NL} + \Theta) \cdot \exp(-j\Delta\phi_{NL}) \cong A_o \cdot \exp(j(\phi_d + \Theta))$$

Thus, application of $\exp(-j\Delta\phi_{NL})$ to a received signal may yield a corrected optical field for the signal that is at least approximately equal to the same optical field without the phase shift or noise introduced during transmission. Such an application may be made to each of x- and y-polarizations separately or to a signal as a whole.

Figure 3:
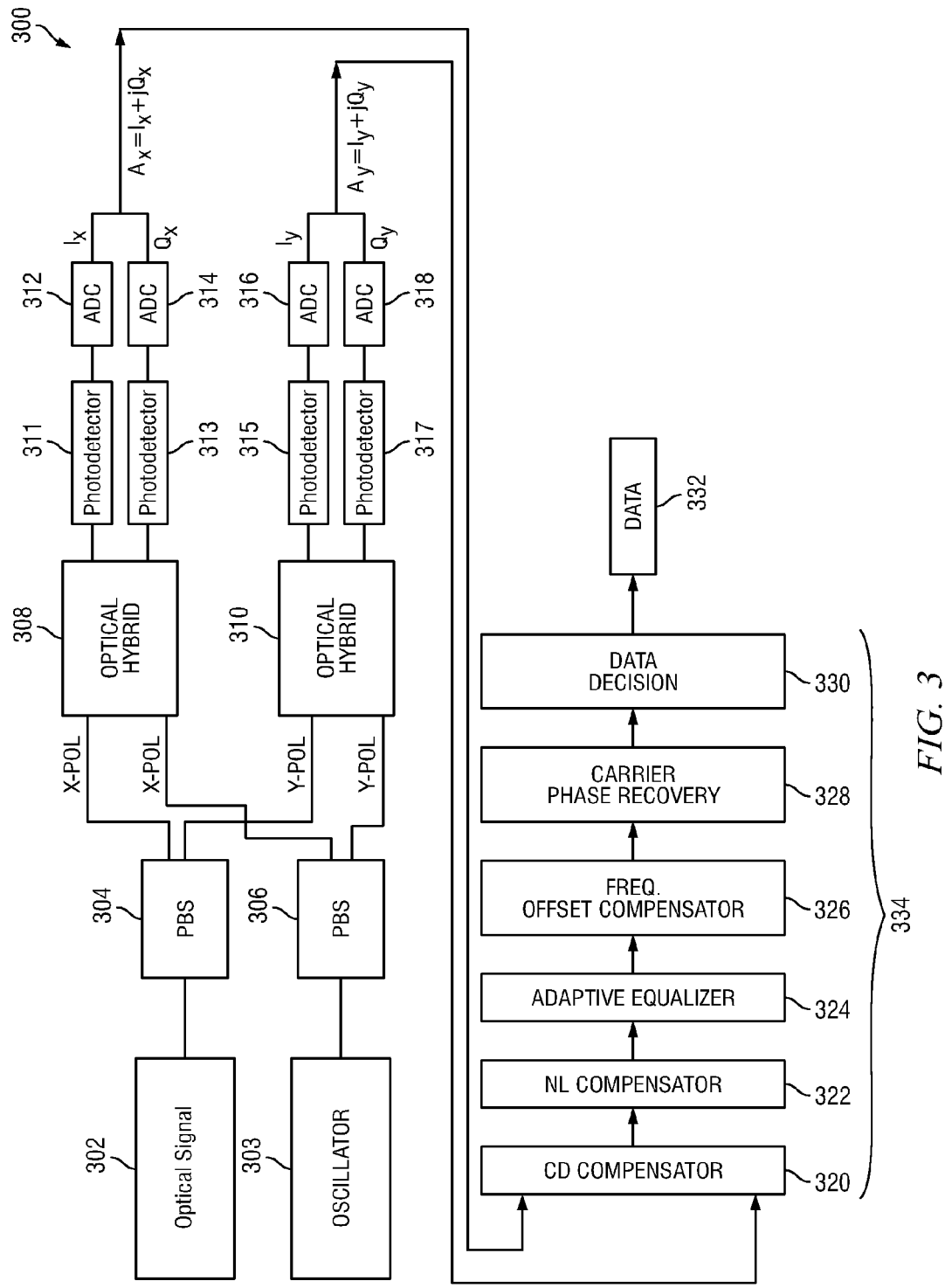
FIG. 3 illustrates an example compensation system for compensating an optical signal for degradation due to combined nonlinear and polarization dependent loss effects in dual polarization optical systems.

FIG. 3 illustrates an example compensation system 300 for compensating an optical signal for degradation due to combined NL and PDL effects in dual polarization optical systems. Such a compensation system 300 may be implemented within, for example, any suitable portion of network 101, such as OADM 110 or receivers 112. System 300 may include any suitable manner for receiving an optical signal 302 and applying nonlinear compensation to yield data 332. In one embodiment, system 300 may include NL compensator 322 configured to compensate optical signal 302 for degradation due to combined NL and PDL effects.

Compensation system 300 may include an oscillator such as a local oscillator (LO) 303. Compensation system 300 may include one or more polarization beam splitters (PBS) 304, 306 connected to optical signal 302 and LO 303, respectively, and configured to split the input signal into x- and y-polarization components. PBS 304, 306 may be implemented in any suitable fashion to perform the functionality described herein. The x-polarization output of each of PBS 304 and PBS 306 may be communicatively coupled to optical hybrid 308. The y-polarization output of each of PBS 304 and PBS 306 may be communicatively coupled to optical hybrid 310. Each of optical hybrids 308, 310 may be implemented by, for example, a ninety-degree optical hybrid. Optical hybrids 308, 310 may each be configured to mix an incoming signal with a reference signal (such as a polarized component of each of optical signal 302 and LO 303) and produce electric fields. Optical hybrids 308 may be communicatively coupled to a pair of balanced photodetectors 311, 313. Optical hybrid 310 may be communicatively coupled to a pair of balanced photodetectors 315 317. The outputs of photodetectors 311, 313 and photodetectors 315, 317 may converted to digital signals by analog to digital converters (ADC) 312, 314 and ADCs 316, 318, respectively. The output of ADC 312 may correspond to the I portion of the x-polarization; the output of ADC 314 may correspond to the Q portion of the x-polarization; the output of ADC 316 may correspond to the I portion of the y-polarization; and the output of ADC 318 may correspond to the Q portion of the y-polarization. The resulting optical field components may be described as $(A_x = I_x + jQ_x)$ from ADCs 312, 314 and $(A_y = I_y + jQ_y)$ from ADCs 316, 318.

Optical field components generated in system 300 may be provided as inputs adjustment components 334. Adjustment components 334 may be implemented as a digital signal processing (DSP) circuit. The signals input to adjustment components 334 may be adjusted or compensated using one or more of adjustment components 334. The number and kind of elements of adjustment components 334 may be selected based on the type of noise, distortion, or other impurities that are to be removed or compensated. Any suitable combination of adjustment components 334 may be used. In one embodiment, adjustment components 334 may include NL compensator 322 configured to compensate optical signal 302 for degradation due to combined NL and PDL effects.

Adjustment components 334 may include a chromatic dispersion compensator 310 communicatively coupled to ADCs 312, 314, 316, 318 and configured to receive complex field components representative of optical signal 302. Chromatic dispersion compensator 320 may be configured to compensate the signal it has received for chromatic dispersion in any suitable manner. Chromatic dispersion compensator 320 may be implemented in any suitable fashion. Chromatic dispersion compensator 320 may be communicatively coupled to NL compensator 322 and configured to send its output, a compensated signal, to NL compensator 322.

NL compensator 322 may be configured to receive signals from chromatic dispersion compensator 320 and apply phase rotation that is inversely proportional to the phase shift induced during transmission, such as that described above. Thus, NL compensator 322 may be configured to compensate for NL effects induced by PDL. NL compensator 322 may be communicatively coupled to adaptive equalizer 324 and configured to send its output, a compensated signal, to adaptive equalizer 324.

Adjustment components 334 may include an adaptive equalizer 324 communicatively coupled to NL compensator 322 and configured to receive a compensated version of optical signal 302. Adaptive equalizer 324 may be configured for polarization demultiplexing and equalization. Such operations may include operations to normalize or otherwise balance the power levels of its received signal in any suitable manner. Adaptive equalizer 324 may be implemented in any suitable fashion. Adaptive equalizer 324 may be communicatively coupled to frequency offset compensator 326 and send its output, a compensated signal, to frequency offset compensator 326.

Adjustment components 334 may include a frequency offset compensator 326 communicatively coupled to adaptive equalizer 324 and configured to receive a compensated version of optical signal 302. Frequency offset compensator 326 may be configured to compensate the x- and y-polarizations of its received signal for offsets in any suitable manner, such as for carrier frequencies. Frequency offset compensator 326 may be implemented in any suitable fashion. Frequency offset compensator 326 may be communicatively coupled to carrier phase recovery module 328 and send its output, a compensated signal, to carrier phase recovery module 328.

Adjustment components 334 may include a carrier phase recovery module 328 communicatively coupled to frequency offset compensator 326 and configured to receive a compensated version of optical signal 302. Carrier phase recovery module 328 may be configured to determine and correct rotation offsets of the received signals in any suitable manner. Carrier phase recovery module 328 may be implemented in any suitable fashion. Carrier phase recovery module 328 may be communicatively coupled to data decision module 330 and send its output, a compensated signal, to data decision module 330.

Adjustment components 334 may include a data decision module 330 communicatively coupled to polarization carrier phase recovery module 328 and configured to receive a compensated version of optical signal 302. Data decision module 330 may be configured to interpret the carried values on the received signal in any suitable manner. Data decision module 330 may be implemented in any suitable fashion. Data decision module 330 may send its output, a compensated signal, as data 332.

Figure 4:
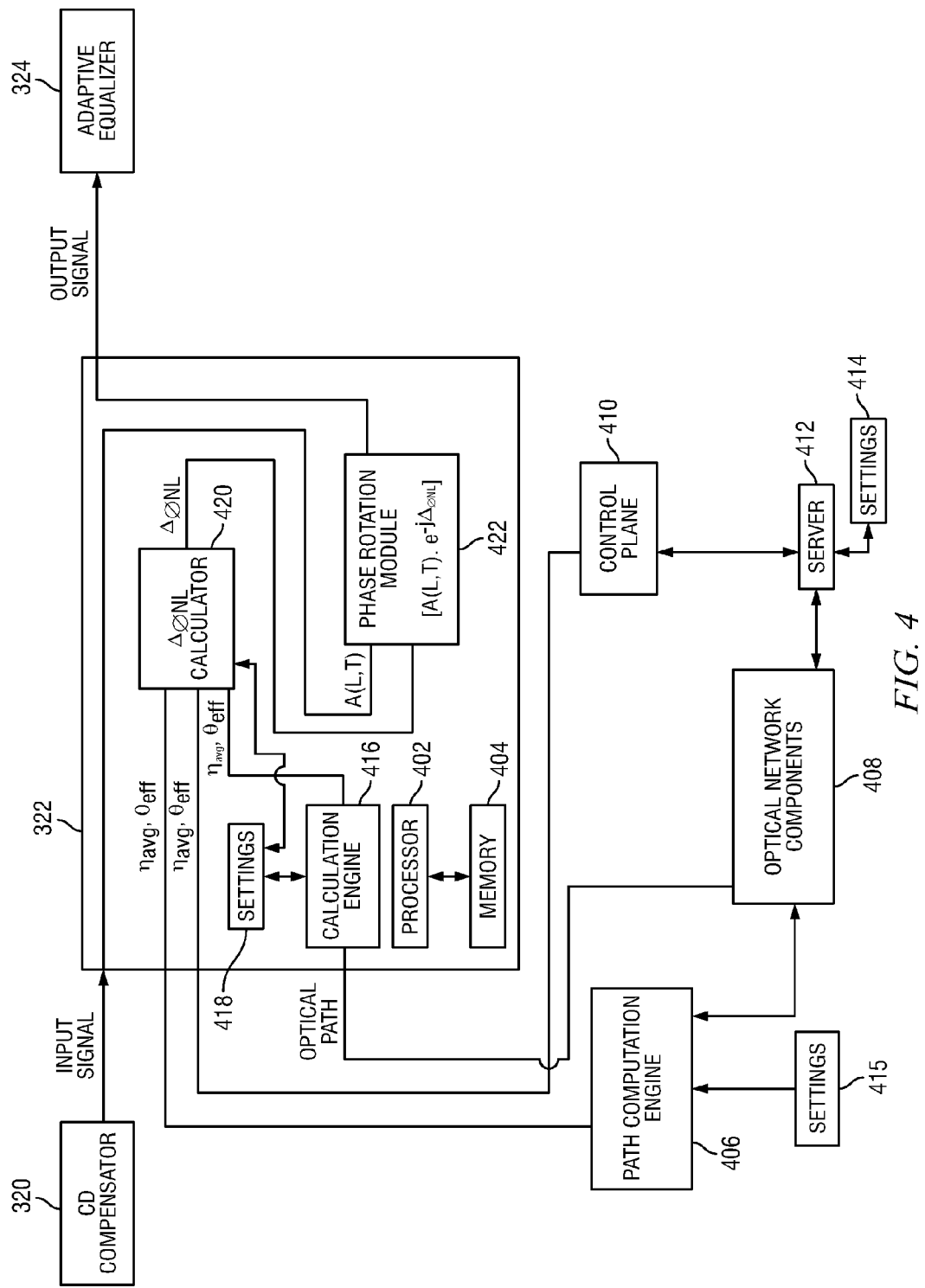
FIG. 4 is a more detailed illustration of an example embodiment of a nonlinear compensator.

FIG. 4 is a more detailed illustration of an example embodiment of NL compensator 322. NL compensator 322 may be implemented in any suitable manner, such as by a device, card, module, electronic hardware, software in combination with electronic hardware, or optical components. NL compensator 322 may include a processor 402 coupled to a memory 404. NL compensator 322 may include instructions in memory 404 for execution by processor 402. Processor 404 may include, for example a microprocessor, microcontroller, digital signal processor (DSP), application specific integrated circuit (ASIC), or any other digital or analog circuitry configured to interpret and/or execute program instructions and/or process data. Memory 404 may be configured in part or whole as application memory, system memory, or both. Memory 404 may include any system, device, or apparatus configured to hold and/or house one or more memory modules. Each memory module may include any system, device or apparatus configured to retain program instructions and/or data for a period of time (e.g., computer-readable media).

Although NL compensator 322 is illustrated as communicatively coupled to chromatic dispersion compensator 320 for receiving input signals and to adaptive equalizer 324 for sending output signals, NL compensator 322 may be communicatively coupled to any suitable portion of system 300 for sending and receiving input/output signals.

Furthermore, NL compensator 322 may be communicatively coupled to any suitable entities for receiving information to determine accumulated nonlinear phase noise due to combined NL and PDL. Such information may include, for example, optical paths, average PDL values, effective angles between optical signal 302 and PDL polarization axes, or settings. In various embodiments, NL compensator 322 may be communicatively coupled to a path computation engine 406, optical network components 408, or control plane 410.

NL compensator 322 may be configured to determine an average PDL value and an effective angle between optical signal 302 as received by NL compensator 322 and the PDL polarization axes. NL compensator 322 may be configured to make such determinations in any suitable manner. In one embodiment, NL compensator 322 may be configured to receive such information from path computation engine 406, which may be configured to make such determinations through settings, experimentally, or through simulations based on the configuration of the network in which system 300 resides. For example, path computation engine 406 may access optical network components 408 of the network in which system 300 resides to simulate or measure average PDL value and the effective angle. In another example, path computation engine 406 may determine the identity of optical network components 408 and, based on such identities, look up the average PDL value and effective angle in settings 415. Settings 415 may be stored in any suitable data structure, memory, or storage. Path computation engine 406 may be implemented in any suitable manner, such as by a controller, software, computing device, module, card, or other suitable analog or digital circuitry.

In another embodiment, NL compensator 322 may be configured to receive such information through control plane 410, which may be configured to provide determinations through settings 414 based on the configuration of the network in which system 300 resides. Settings 414 may include the actual PDL values and effective angles to use, or information upon which the PDL value and effective angle may be determined. Settings 414 may be stored in any suitable data structure, memory, or storage. Control plane 410 may provide access to NL compensator 322 and one or more other entities, such as server 412. Server 412 may be configured to control various aspects of the network in which system 300 resides, such as configuration and operation. Server 412 may be configured to determine a PDL value and effective angle to provide to NL compensator 322 through settings 414. Furthermore, server 412 may be configured to determine a PDL value and effective angle through simulation, measurement, or other analysis of optical network components 408. Server 412 may be implemented in any suitable manner, such as by a controller, software, computing device, module, card, or other suitable analog or digital circuitry.

In yet another embodiment, NL compensator 322 may be configured to receive optical path information from one or more elements of the network in which system 300 resides, such as optical network components 408. NL compensator 322 may then be configured to determine the average PDL value and effective angle through simulations, calculations, or by looking up information such as settings 418. In order to make such a determination, NL compensator 322 may include a calculation engine 416. Calculation engine 416 may be configured to accept optical path information and, based upon the identity of the elements within such a path, determine an average PDL value and effective angle. Furthermore, calculation engine 416 may rely upon settings 418 for such determinations. Settings 414 may include the actual PDL values and effective angles to use, or information upon which the PDL value and effective angle may be determined given various optical components. Settings 414 may be stored in any suitable data structure, memory, or storage. Calculation engine 416 may be implemented in any suitable manner, such as by a computing device, module, functions, applications, scripts, or any other suitable combination of analog and digital circuitry.

NL compensator 322 may be configured to determine the amount of accumulated nonlinear phase noise in its received signal in any suitable manner. In one embodiment, NL compensator 322 may be configured to make such a determination with respect to a combination of NL and PDL effects. NL compensator 322 may be configured to make such a determination in any suitable manner. In a further embodiment, NL compensator 322 may be configured to use an average PDL value and effective angle to make such determinations. Such an average PDL value and effective angle may be determined, for example, by accessing path computation engine 406, control plane 410, or calculation engine 416. Given an average PDL value and effective angle, NL compensator 322 may be configured to determine the amount of accumulated nonlinear phase noise as $$\Delta\phi_{NL} = \gamma \cdot \Delta P \cdot Leff = \gamma \cdot Leff \cdot 2 \cdot \eta_{avg} \cdot Nspan \cdot \sin 2\theta eff \cdot P$$

wherein $\eta_{avg}$ may include the average PDL loss; $L_{eff}$ may include the fiber effective length in the span of the network in which system 300 is deployed; Nspan may include the span of distance of the network; $\gamma$ may include the fiber nonlinear coefficient; $\theta_{eff}$ may include the effective angle between the signal and PDL axes; and P may include the peak power of the optical field. To make such a determination, NL compensator 322 may include $\Delta\phi_{NL}$ calculator 420, which may be configured to receive $\eta_{avg}$ and $\theta_{eff}$ from any appropriate source, such as path computation engine 406, control plane 410, or calculation engine 416. $\Delta\phi_{NL}$ calculator 420 may access information for other parameters from, for example, settings 418 or in conjunction with the same sources that provided $\eta_{avg}$ and $\theta_{eff}$. $\Delta\phi_{NL}$ calculator 420 may be configured to provide $\Delta\phi_{NL}$ to phase rotation module 422. $\Delta\phi_{NL}$ calculator 420 may be implemented in any suitable manner, such as a module, functions, applications, scripts, or any suitable combination of analog and digital circuitry. $\Delta\phi_{NL}$ calculator 420 may be configured to determine $\Delta\phi_{NL}$ for an x-polarization, a y-polarization, or a composite of both x- and y-polarizations.

NL compensator 322 may be configured to apply a phase rotation to its input signal to compensate for phase shift due to NL and PDL effects. NL compensator 322 may be configured to apply any suitable phase rotation in any suitable manner. In one embodiment, NL compensator 322 may be configured to apply a phase rotation that is inversely proportional to the phase shift caused by NL and PDL. In a further embodiment, such a phase rotation may be complex. For example, the phase rotation may be expressed by $\exp(-j*\Delta\phi_{NL})$. In another embodiment, NL compensator 322 may be configured to apply a phase rotation by multiplying the phase rotation by the received input signal. In a further embodiment, such an input signal may be a complex optical field. For example, the optical field of the input signal may be given by the function A(L,T). To conduct such application of phase rotation to its input signal, NL compensator 322 may include phase rotation module 422. Phase rotation module 422 may be configured to multiply the received input signal, A(L,T), by the $\Delta\phi_{NL}$ output of $\Delta\phi_{NL}$ calculator 420. Thus, the output of phase rotation module 422, and thus the output of NL compensator, may be given by $$NL\_compensator\_output = A(L,T) \cdot \exp(-j\Delta\phi_{NL}) = A(L,T) \cdot \exp(-j \cdot \gamma \cdot L_{eff} \cdot 2 \cdot \eta_{avg} \cdot N\text{span} \cdot \sin 2\theta_{eff} \cdot P)$$

Phase rotation module 422 may be configured to apply phase rotation for an x-polarization, a y-polarization, or a composite of both x- and y-polarizations. Phase rotation module 422 may be implemented in any suitable manner, such as a module, functions, applications, scripts, or any other suitable combination of analog and digital circuitry.

In operation, optical signals may be transmitted in network 101 from one or more transmitters 102 to one or more receivers 112. Signals from multiple transmitters 102 may be multiplexed by multiplexer 104 onto optical fibers 106. The optical signals of network 101 may be amplified by the one or more amplifiers 108. Optical signals may be added or dropped in network 101 by one or more OADMs 110. Upon reaching receivers 112, the optical signals may be demultiplexed by demultiplexer 105. Network 101 may transmit dual-polarized signals.

At any suitable location in network 101, such as at OADM 110 or receiver 112, network 101 may conduct compensation for NL and PDL effects. Such compensation may be performed by an instance of compensation system 300.

In one embodiment, in compensation system 300, optical signal 302 may be received and split into a x-polarization and y-polarization signal components by polarization beam splitter 304. LO 303 may generate a reference signal with x-polarization and y-polarization components that may be split by polarization beam splitter 306. The x-polarization outputs of polarization beam splitters 304, 306 may be routed to optical hybrid 308 and the y-polarization outputs of polarization beam splitters 304, 306 may be routed to optical hybrid 310. Optical hybrids 308, 310 may mix their respective polarization inputs and output the mixed signal to balanced photodetectors 311, 313 and to balanced photodetectors 315, 317, respectively. Balanced photodetectors 311, 313 and balanced photodetectors 315, 317 may output signals to ADCs 312, 314 and ADCs 316, 318, respectively. ADCs 312, 314 may produce a real and imaginary component of the complex field representation for the x-polarization and ADCs 316, 318 may produce a real and imaginary component of the complex field representation for the y-polarization.

Upon receipt of a complex field representation of optical signal 102, adjustment components 334 may compensate, reduce, or otherwise eliminate noise or other aspects of optical signal 102 that contribute to signal degradation. Chromatic dispersion compensator 310 may compensate for chromatic dispersion and provide the result to NL compensator 322. NL compensator 322 may compensate for noise due to phase shifts because of NL and PDL effects and provide the result to adaptive equalizer 324. Adaptive equalizer 324 may provide polarization demultiplexing, PMD compensation and normalize or otherwise balance the power levels of the received signal and provide the result to frequency offset compensator 326. Frequency offset compensator 326 may compensate the x- and y-polarizations of its received signal for offsets in any suitable manner, such as for carrier frequencies, and provide the result to carrier phase recovery module 328. Carrier phase recovery module 328 determine and correct rotation offsets of the received signal and provide the result to data decision module 330. Data decision module 330 may interpret the carried values on the received signal and provide the result as data 332.

Given an input signal, NL compensator 322 may determine an average PDL value and an effective angle for the received signal and network in which compensation system 300 resides, such as network 101. Such a determination may be made, for example, by accessing or receiving optical path information, the PDL value, and effective angle from path computation engine 406 or control plane 410. Path computation engine 406 may have calculated or determined such information through experimentation, simulation, or measurement of optical network components 408 or through settings 415. Control plane 410 may communicate such information from settings 414 or from server 412, which may have determined such information through experimentation, simulation, or measurement of optical network components 408 or through settings 414. In another example, a determination of the average PDL value and effective angle may have been made by calculation engine 416. Such a determination may have been made in conjunction with settings 418 or optical path information such as that received from optical network components 408.

Given an average PDL value and an effective angle for the received signal, NL compensator 322 may be configured to determine a phase shift due to NL and PDL noise within the received signal. Such a determination may be made through $\Delta\phi_{NL}$ calculator 420. Once the phase shift has been determined, NL compensator 322 may apply a phase rotation to the input signal. The phase rotation may include $\exp(-j*\Delta\phi_{NL})$. In one embodiment, NL compensator 322 may apply the phase rotation to a complex field representation of the optical signal. In a further embodiment, NL compensator 322 may apply the phase rotation by multiplying the complex field representation times the phase rotation. NL compensator 322 may apply the phase rotation through phase rotation module 422. NL compensator 322 may output the compensated field representation as its output signal.

Figure 5:
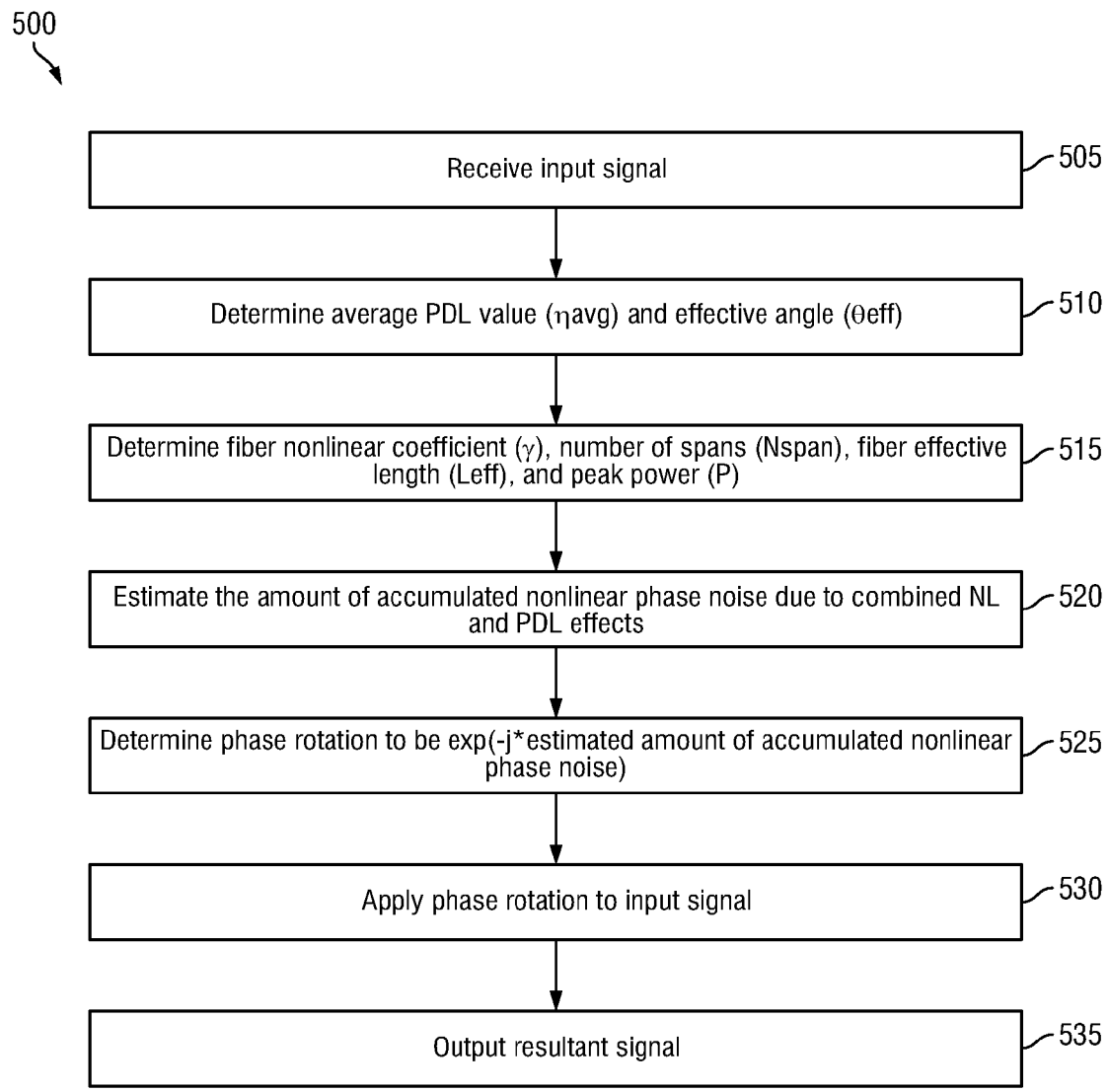
FIG. 5 illustrates an example method for compensating for signal degradation due to polarization dependent loss and nonlinear effects upon phase shift.

FIG. 5 illustrates an example method 500 for compensating for signal degradation due to NL and PDL effects upon phase shift. In 505, an input signal that is to be compensated for signal degradation may be received. In one embodiment, the input signal may include dual-polarization signals that may be split into x-polarization or y-polarization components. In another embodiment, the input signal may include dual-polarization signals that are maintained in composite form. A complex field representation of the input signal may be determined.

In 510, an average PDL value and effective angle may be determined. The PDL value and effective angle may be determined in any suitable manner, such as through looking up values based on network components, simulating network activity, or measuring network activity. The average PDL value and effective angle may be represented by $\eta_{avg}$ and $\theta\text{eff}$, respectively.

In 515, other aspects of an optical path for the input signal may be determined. Such aspects may include may include the fiber effective length of a span in the network (Leff), the number of spans in the network (Nspan), the fiber nonlinear coefficient ($\gamma$), and the peak power (P) of the optical field of the input signal. In one embodiment, the $L_{eff}$ may be approximately twenty kilometers. In another embodiment, $L_{eff}$ may be calculated from a fiber attenuation coefficient.

In 520, the amount of accumulated nonlinear phase noise due to combined NL and PDL effects may be determined. In one embodiment, such an amount may be given by $$\Delta\phi_{NL}=\gamma \cdot \Delta P \cdot L_{eff}=\gamma \cdot L_{eff} \cdot 2 \cdot \eta \text{ave} \cdot N\text{span} \cdot \sin 2\theta_{eff} \cdot P$$

In 525, a phase rotation based upon the amount of accumulated nonlinear phase noise may be determined. Such a phase rotation may include the complex inverse of the accumulated nonlinear phase noise. In one embodiment, such an a phase rotation may be given by $\exp(-j^*\Delta\phi_{NL})$.

In 530, the phase rotation may be applied to the input signal. In one embodiment, the phase rotation may be applied by multiplying the complex representation of the phase rotation with the complex representation of the optical field of the input signal. In 535, the resultant signal may be output.

Method 500 may be implemented using the systems of FIGS. 1-4, or any other system operable to implement method 500. As such, the preferred initialization point for method 500 and the order of the elements comprising method 500 may depend on the implementation chosen. In some embodiments, some portions of method 500 may be optionally omitted, repeated, or combined. In certain embodiments, method 500 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or any combination of the foregoing.

Although the present disclosure and its advantages have been described in detail, it should be understood that various changes, substitutions and alterations can be made herein without departing from the spirit and scope of the disclosure as defined by the following claims.

What is claimed is:

1. A method for adjusting an optical signal, comprising:
   determining a polarization dependent loss (PDL) value associated with the optical signal;
   determining an angle between the optical signal and one or more axes of PDL;
   determining an amount of nonlinear phase noise due to PDL and nonlinear effects upon the optical signal based upon the PDL value and the angle;
   determining a phase rotation based upon the amount of nonlinear phase noise; and
   applying the phase rotation to the optical signal.

2. The method of claim 1, wherein the optical signal includes a dual-polarization signal.

3. The method of claim 1, wherein the amount of nonlinear phase noise is proportional to the product of the PDL value and a sine function, the sine function performed on a proportion of the angle.

4. The method of claim 1, wherein the phase rotation includes the complex inverse of the amount of nonlinear phase noise.

5. The method of claim 1, wherein the phase rotation includes the exponential function of the negative complex product of the amount of nonlinear phase noise.

6. The method of claim 1, wherein applying the phase rotation to the optical signal includes multiplying the phase rotation and the optical signal.

7. The method of claim 1, wherein the PDL value and the angle are associated with one or more components of a network through which the optical signal is received.

8. A system for adjusting an optical signal, comprising:
   an optical network configured to transmit the optical signal; and
   a compensator configured to:
      determine a polarization dependent loss (PDL) value associated with the optical signal;
      determine an angle between the optical signal and one or more axes of PDL;
      determine an amount of nonlinear phase noise due to PDL and nonlinear effects upon the optical signal experienced during transmission by the optical network, the amount based upon the PDL value and the angle;
      determine a phase rotation based upon the amount of nonlinear phase noise; and
      apply the phase rotation to the optical signal.

9. The system of claim 8, wherein the optical signal includes a dual-polarization signal.

10. The system of claim 8, wherein the amount of nonlinear phase noise is proportional to the product of the PDL value and a sine function, the sine function performed on a proportion of the angle.

11. The system of claim 8, wherein the phase rotation includes the complex inverse of the amount of nonlinear phase noise.

12. The system of claim 8, wherein the phase rotation includes the exponential function of the negative complex product of the amount of nonlinear phase noise.

13. The system of claim 8, wherein applying the phase rotation to the optical signal includes multiplying the phase rotation and the optical signal.

14. The system of claim 8, wherein the PDL value and the angle are associated with one or more components of the optical network.

15. A compensator, comprising:
   a processor coupled to a memory; and
   instructions resident on the memory, the instructions readable by the processor and, when read, are configured to cause the processor to:
      determine a polarization dependent loss (PDL) value associated with an optical signal transmitted through an optical network;
      determine an angle between the optical signal and one or more axes of PDL;
      determine an amount of nonlinear phase noise due to PDL and nonlinear effects upon the optical signal experienced during transmission by the optical network, the amount based upon the PDL value and the angle;

determine a phase rotation based upon the amount of nonlinear phase noise; and apply the phase rotation to the optical signal.

16. The compensator of claim 15, wherein the optical signal includes a dual-polarization signal.

17. The compensator of claim 15, wherein the amount of nonlinear phase noise is proportional to the product of the PDL value and a sine function, the sine function performed on a proportion of the angle.

18. The compensator of claim 15, wherein the phase rotation includes the complex inverse of the amount of nonlinear phase noise.

19. The compensator of claim 15, wherein the phase rotation includes the exponential function of the negative complex product of the amount of nonlinear phase noise.

20. The compensator of claim 15, wherein the PDL value and the angle are associated with one or more components of the optical network.

\* \* \* \* \*